United States Patent [19]

Blaylock

[11] 4,114,744

[45] Sep. 19, 1978

[54] CLUTCH THROW-OUT BEARING PLATE

[76] Inventor: Tommey J. Blaylock, 2448 N.W. 3, Oklahoma City, Okla. 73107

[21] Appl. No.: 799,448

[22] Filed: May 23, 1977

[51] Int. Cl.² ............................................. F16D 23/14
[52] U.S. Cl. .................................. 192/98; 192/70.26
[58] Field of Search ...................... 192/98, 99 A, 89 B, 192/111 A, 111 R, 70.25, 70.26

[56] References Cited

U.S. PATENT DOCUMENTS

| 986,947 | 3/1911 | Schacht | 192/99 A X |
|---|---|---|---|
| 1,716,436 | 6/1929 | Gamble | 192/98 X |
| 1,886,294 | 11/1932 | Morris | 192/99 A X |
| 2,700,444 | 1/1955 | Ahlen | 192/89 B X |
| 3,211,265 | 10/1965 | Crutchley | 192/99 A |
| 3,831,722 | 8/1974 | Deschamps | 192/98 X |

Primary Examiner—Benjamin W. Wyche
Attorney, Agent, or Firm—Robert K. Rhea

[57] ABSTRACT

In a vehicle clutch construction, a flat plate ring is interposed between the clutch throw-out bearing and clutch release fingers and maintained concentric with the throw-out bearing by a flexible connection with the clutch release fingers.

1 Claim, 10 Drawing Figures

CLUTCH THROW-OUT BEARING PLATE

BACKGROUND OF THE INVENTION

1. Field of the Invention

The present invention relates to vehicle clutches and more particularly to a pressure plate to be installed between the throw-out bearing and clutch release fingers.

In a vehicle clutch construction, a clutch throw-out bearing surrounds the transmission input shaft and is moved axially along this shaft by the clutch pedal for engaging the clutch release fingers to separate the clutch pressure plate from the stationary clutch disk secured to the adjacent face of the flywheel thus disengaging the clutch for shifting transmission gears. Contact between the throw-out bearing and the clutch release fingers results in a three-point frictional wearing-out action of the throw-out bearing necessitating its replacement. This is time consuming and relatively expensive repair in that the gear train, including the transmission of the vehicle, must be disconnected from the clutch in order to remove the old throw-out bearing and install a new one.

2. Description of the Prior Art

Prior patents, such as U.S. Pat. Nos. 3,333,664 and 3,486,598 generally relate to construction of the throw-out bearing rather than a friction or pressure plate to be interposed between the throw-out bearing and the clutch release fingers for minimizing wear of the throw-out bearing.

SUMMARY OF THE INVENTION

A flat ring bearing plate is interposed between one face of the clutch release fingers of a vehicle clutch concentric with the transmission input shaft. Connectors, secured to the ring bearing plate, flexibly connect the ring bearing plate to the clutch release fingers for movement of the clutch release fingers in a radial direction relative to the ring plate as the clutch is engaged and released.

The principal object of this invention is to provide a friction bearing plate to be interposed between the clutch throw-out bearing and clutch release fingers to minimize wear on the clutch throw-out bearing and increase its useful life.

DESCRIPTION OF THE PREFERRED EMBODIMENTS

Figure 1:
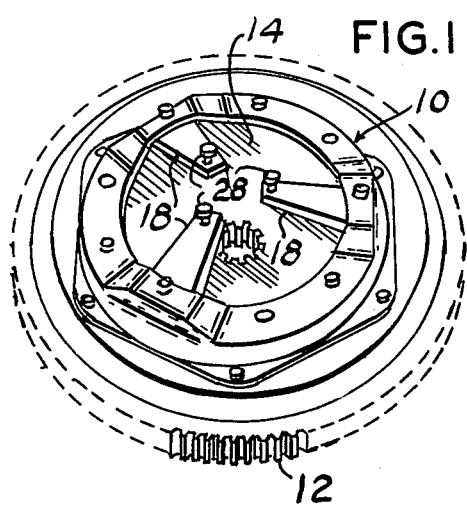
FIG. 1 is a perspective view of a vehicle clutch connected with a flywheel illustrating the relative position of the clutch release fingers which frictionally engage one face of a clutch throw-out bearing.

Like characters of reference designate like parts in those figures of the drawings in which they occur.

In the drawings:

The reference numeral 10 indicates a conventional vehicle clutch secured to one face of a flywheel 12. The clutch 10 includes a pressure plate 14 normally urged into frictional engagement with a clutch disk by a plurality of springs, neither being shown, contained by the clutch. The clutch pressure plate 14 is axially moved away from the clutch disk to release the clutch by three clutch release levers or fingers 18 having their free end portions normally spring biased axially away from the clutch toward a clutch throw-out bearing 20 supported by a throw-out bearing support 22. The clutch throw-out bearing 20 and its support 22 coaxially surrounds a transmission input shaft 24 extending between the vehicle transmission T and the clutch 10 with its splined forward end portion 26 cooperatively surrounded by the clutch pressure plate 14. The free end portion of the three clutch release fingers 18 are usually provided with a like plurality of stud bolts 28, or the like, for frictional contact with the adjacent face of the throw-out bearing 20 when a clutch pedal operated lever 30 moves the throw-out bearing 20 toward the clutch. Frictional contact of the clutch throw-out bearing, with the clutch release finger supported stud bolts 28 rotating with the clutch, results in undue wear on the adjacent face of the clutch throw-out bearing.

The above description is conventional with several truck vehicle clutches and throw-out bearings and is set forth to show the structure with which the present invention is intended to be used.

In carrying out the invention a ring-like flat plate 35, having a diameter substantially equal to the diameter of the clutch throw-out bearing 20 and a bore 36 diametrically greater that the diameter of the transmission input shaft 24, is provided with a plurality of connectors 38, three in the example shown, for attaching the plate 35 to the clutch release fingers 18. The connectors 38 include stud bolts 39 each having a head portion 40 loosely contained by a cylindrical housing 42 secured to one face of the plate 35 in circumferentially equally spaced relation. Each of the housings 42 are provided with a slot 44 extending radially of the plate 35 for permitting sliding movement of the bolt head 40 within its respective housing for the purposes believed readily apparent.

Figure 2:
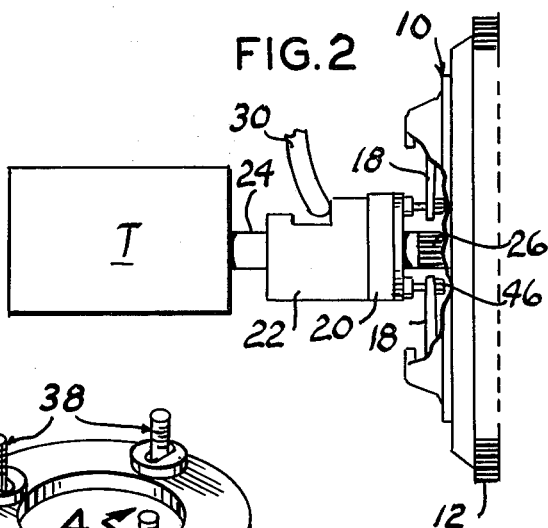
FIG. 2 is a side elevational view of a vehicle clutch connected with a transmission through an input shaft having a throw-out bearing thereon with parts broken away for clarity and illustrating the clutch throw-out bearing pressure plate in clutch released position.
Figure 3:
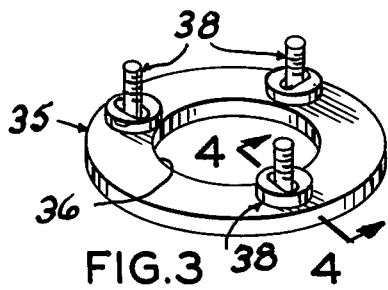
FIG. 3 is a perspective view of one embodiment of the throw-out bearing pressure plate.
Figure 4:
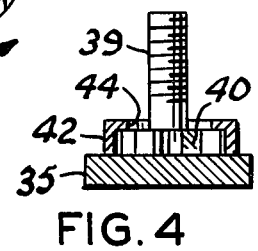
FIG. 4 is a verticle cross sectional view, to a larger scale, taken substantially along the line 4—4 of FIG. 3.

The throw-out bearing plate 35 is interposed between the throw-out bearing 20 and clutch release fingers 18 after disconnecting the transmission input shaft from the clutch disk 14. The conventional clutch finger studs 28 are removed and the connectors 38 are threadly engaged with the respective clutch release finger including one or more lock nuts 46 for maintaining the position of the connectors 38 with respect to the clutch fingers 18. Thus, as shown by FIG. 2, when the clutch throw-out bearing 20 is moved toward the clutch the face of the throw-out bearing plate 35, opposite its connectors, flatly engages the adjacent face of the clutch throw-out bearing 20 with such area of engagement being equal to the face area of the clutch throw-out bearing plate 35 thus evenly distributing clutch release pressure on the face of the throw-out bearing facing the clutch 10.

Figure 5:
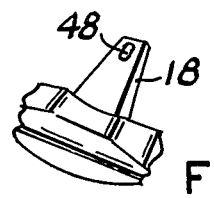
FIG. 5 is a fragmentary perspective view illustrating a modification of the clutch release fingers.

Alternatively the connectors 38 may have their bolt head portions 40 rigidly connected with one face of the clutch throw-out bearing plate 35 and, in this event the free end portions of the respective clutch fingers 18, after removing the stud bolts 28, are provided with slot-like apertures 48 (FIG. 5) to compensate for the pivoting movement of the clutch fingers 18 in a radial direction with respect to the bearing plate 35 when moved by the throw-out bearing to a clutch released or engaged position.

Figure 6:
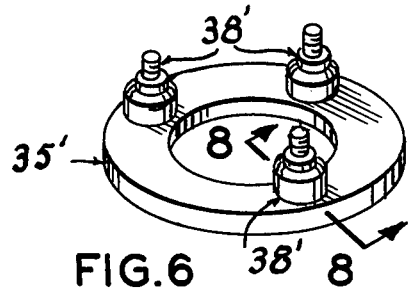
FIGS. 6 and 7 are perspective views illustrating other embodiments of the clutch throw-out bearing pressure plate.
Figure 8:
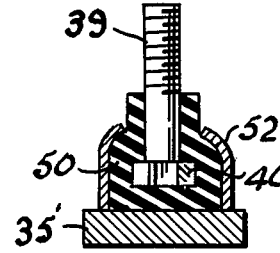
FIGS. 8 and 9 are vertical cross sectional views, to a larger scale, taken substantially along the lines 8—8 and 9—9 of FIGS. 6 and 7, respectively; and, FIG. 10 is a vertical cross sectional view taken substantially along the line 10—10 of FIG. 9.

Referring now to FIGS. 6 and 8, the connectors 38' similarly comprise stud bolts 39 having their head portions 40 imbedded in a substantially truncated conical-shaped section of resilient material, such as rubber 50, surrounded and secured to the throw-out bearing plate 35' by housings 52 thus permitting flexing movement of the stud bolts 39 relative to the bearing plate when connected with the clutch release fingers 18.

Figure 7:
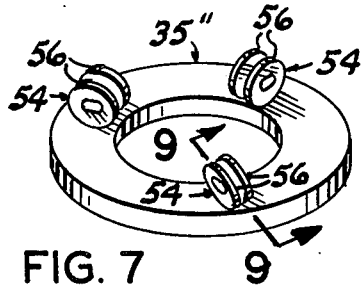
Figure 9:
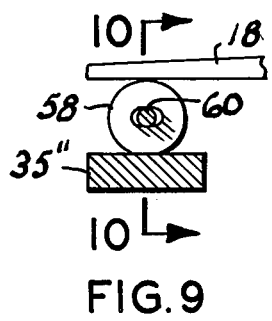
Figure 10:
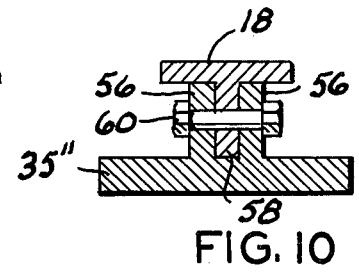

Referring now to FIGS. 7, 9 and 10, another embodiment 35'' of the clutch throw-out bearing plate includes apertured disk-like connectors 54. The connectors 54 each include a pair of apertured disks 56 arranged in close spaced parallel edgewise relation with their common axis perpendicular to a radius of the throw-out bearing pressure plate taken between the respective pair of disks 56. In this embodiment a third apertured disk 58 is secured to the respective clutch release finger 18 for cooperative entry between the respective pair of disks 56. The disks 56 and 58 are joined by a pin 60 extending through the apertures of the disks, the apertures being elongated in a direction parallel with respect to the longitudinal axis of the respective clutch release finger 18 to permit relative pivoting movement of the respective clutch release finger 18 with respect to the throw-out bearing pressure plate 35'' during application and release of the clutch.

Obviously the invention is susceptible to changes or alterations without defeating its practicability. Therefore, I do not wish to be confined to the preferred embodiment shown in the drawings and described herein.

I claim:

1. In a vehicle clutch assembly having a flywheel and a clutch pressure plate movable toward and away from the flywheel by a plurality of radially inwardly projecting clutch release fingers, a transmission input shaft connecting the clutch pressure plate with a transmission and having a clutch throw-out bearing coaxially mounted on the shaft and movable toward and away from the inwardly directed end portions of said clutch release fingers, the improvement comprising:

a bearing plate comprising a flat ring-like plate coaxially surrounding said transmission input shaft and interposed between said throw-out bearing and the inwardly directed end portions of said clutch release fingers; and, a plurality of connector means connecting said bearing plate means with said fingers permitting limited movement of said clutch release fingers in a radial direction with respect to said bearing plate when said throw-out bearing plate and said clutch release fingers are moved toward and away from said clutch pressure plate, each said connector means comprising a stud bolt having its shank threadedly engaged with the respective said finger and having a head portion disposed adjacent said bearing plate, and, a generally cylindrical housing loosely surrounding said stud bolt head portion and connected with one face surface of said ring-like plate, said housing having a slot transversely surrounding said stud bolt shank adjacent said stud bolt head portion with the longitudinal axis of the slot extending in a radial direction with respect to said bearing plate.

* * * * *